United States Patent
Winter et al.

[11] Patent Number: 5,973,297
[45] Date of Patent: Oct. 26, 1999

[54] APPARATUS AND METHOD FOR HEAT REGULATION OF DEEP FAT FRYER

[75] Inventors: David B. Winter, Eaton; James D. King, Kettering; Robert W. Stirling, Dayton, all of Ohio

[73] Assignee: Henny Penny Corporation, Eaton, Ohio

[21] Appl. No.: 08/825,377

[22] Filed: Mar. 28, 1997

Related U.S. Application Data

[60] Provisional application No. 60/014,377, Mar. 28, 1996.
[51] Int. Cl.$^6$ ....................................................... A47J 37/12
[52] U.S. Cl. ............................ 219/441; 219/439; 99/403; 99/408
[58] Field of Search .................................... 219/439, 441, 219/442, 483, 486, 492, 494; 99/330, 403, 408, 409

[56] References Cited

U.S. PATENT DOCUMENTS

| | | |
|---|---|---|
| 1,990,351 | 2/1935 | Shroyer . |
| 2,176,869 | 10/1939 | Childs . |
| 2,994,760 | 8/1961 | Pecoraro et al. . |
| 3,159,344 | 12/1964 | Wilson . |
| 3,376,806 | 4/1968 | Magnusson . |
| 3,640,208 | 2/1972 | Size . |
| 4,197,581 | 4/1980 | Watrous et al. ........................ 219/494 |
| 4,282,423 | 8/1981 | Volz . |
| 4,320,285 | 3/1982 | Koether . |
| 4,488,478 | 12/1984 | Leeper . |
| 4,503,320 | 3/1985 | Polster . |
| 4,590,361 | 5/1986 | Fabbro ..................................... 99/330 |
| 4,601,004 | 7/1986 | Holt et al. . |

(List continued on next page.)

FOREIGN PATENT DOCUMENTS

| | | |
|---|---|---|
| 0135707 | 4/1985 | European Pat. Off. . |
| 0148556 | 7/1985 | European Pat. Off. . |
| 3241008 | 5/1984 | Germany . |
| 3602021 | 7/1987 | Germany . |
| 66822 | 1/1973 | Luxembourg . |

*Primary Examiner*—Joseph Pelham
*Attorney, Agent, or Firm*—Baker & Botts, LLP

[57] ABSTRACT

The invention relates to a cooking device including a vessel for heating a cooking substance. The cooking substance is divided between a heating zone, a transition zone, and a cold zone. A first heating element is used to heat the cooking substance in the heating zone, and a transition zone heating device is used to heat the cooking substance in the transition zone. The transition zone heating device may be a pump for introducing a mixing medium into the cooking substance in the transition zone whereby the cooking substance in the heating zone mixes with the cooking substance in the transition zone. The mixing medium may be air, whereby the cooking substance in the heating zone is turbulently mixed with the cooking substance in the transition zone. The mixing medium also may be a portion of the cooking substance withdrawn by the pump from the transition zone and then reintroduced to the transition zone, thereby creating turbulence in the transition zone. The transition zone heating device may also be a second heating element. A method for operating a cooking device includes a vessel for heating a cooking substance. The cooking substance is divided between a heating zone, a transition zone, and a cold zone. The method comprises the steps of heating the cooking substance in the heating zone to a predetermined temperature and mixing the cooking substance in the transition zone with the cooking substance in the heating zone, thereby creating turbulence within the cooking substance in the transition zone. The turbulence is created by introducing air into the cook substance in the transition zone or by withdrawing a portion of the cooking substance from the transition zone and reintroducing the portion to the transition zone.

22 Claims, 9 Drawing Sheets

Microfiche Appendix Included
(3 Microfiche, 35 Pages)

U.S. PATENT DOCUMENTS

| | | | |
|---|---|---|---|
| 4,603,622 | 8/1986 | Beck | 99/403 |
| 4,623,544 | 11/1986 | Highnote . | |
| 4,636,949 | 1/1987 | Longabaugh . | |
| 4,684,412 | 8/1987 | Fritzsche . | |
| 4,690,127 | 9/1987 | Sank . | |
| 4,768,426 | 9/1988 | Nett | 99/408 |
| 4,785,725 | 11/1988 | Tate et al. . | |
| 4,812,625 | 3/1989 | Ceste, Sr. . | |
| 4,848,318 | 7/1989 | Brewer . | |
| 4,913,038 | 4/1990 | Burkett et al. . | |
| 4,913,041 | 4/1990 | Taber et al. | 99/403 |
| 4,928,664 | 5/1990 | Nishino et al. . | |
| 5,038,753 | 8/1991 | Yokoyama et al. . | |
| 5,060,559 | 10/1991 | Winter . | |
| 5,180,600 | 1/1993 | Hsieh et al. . | |
| 5,186,097 | 2/1993 | Vaseloff et al. . | |
| 5,232,151 | 8/1993 | Mercer et al. . | |
| 5,244,379 | 9/1993 | Stirling et al. . | |
| 5,253,566 | 10/1993 | McCabe et al. . | |
| 5,261,322 | 11/1993 | Yokoyama et al. . | |
| 5,296,683 | 3/1994 | Burkett et al. . | |
| 5,352,866 | 10/1994 | Cartwright et al. | 99/330 |
| 5,354,570 | 10/1994 | Friedman . | |
| 5,402,713 | 4/1995 | King . | |
| 5,404,799 | 4/1995 | Bivens | 99/403 |
| 5,539,185 | 7/1996 | Polster | 219/439 |
| 5,577,438 | 11/1996 | Amitrano et al. . | |
| 5,743,175 | 4/1998 | Crain et al. | 99/408 |

APPARATUS AND METHOD FOR HEAT REGULATION OF DEEP FAT FRYER

This application claims the benefit of provisional application Ser. No. 60/014,377 filed Mar. 28, 1996.

MICROFICHE APPENDICES

Three microfiche appendices are filed with this application. Microfiche Appendix 1 contains a total of one microfiche and seven frames. Microfiche Appendix 2 contains a total of one microfiche and seven frames. Microfiche Appendix 3 contains a total of one microfiche and twenty-one frames.

BACKGROUND OF THE INVENTION

1. Field of the Invention

This invention is directed generally to apparatus and methods for heat regulation of cooking systems, such as a deep fat fryer, and more specifically to apparatus and methods for heat regulation for use with such flyers for regulating the temperature of a transitional zone of the flyer, so as to eliminate the potential boiling of a cooking substance within the fryer.

2. Description of Related Art

Large capacity pressurized deep fat fryer cookers (referred herein as deep fat fryers, cooking devices, cookers, and the like) have been devised for cooking products in a heated and/or pressurized environment. Typically such devices comprise a cooking vessel, which may be filled with a type of cooking substance (e.g., oil or shortening) and heating devices surrounding or immersed in the vessel for heating the cooking oil. Products to be cooked are placed in the vessel, either directly or possibly contained in a wire basket, and are cooked for a desired length of time.

While such cooking devices described above provide for a relatively effective cooking environment, a problem exists with these devices. Specifically, the cooking substance (e.g., oil or shortening) used in these cooking devices has the potential to boil over the sides of the cooking vessel at certain times. This problem is linked to the amount of moisture contained within the "cracklings" found within the non-cooking zones of the cooking substance, i.e., usually toward the bottom of the vessel.

Generally, "cracklings" are pieces of breading, skin or other items which have dropped off of a food item being cooked in the fryer. For example, if fried chicken pieces are being cooked within the vessel, some of the breading applied before cooking the chicken may break away from the chicken and drift to the lower zones of the vessel. In the lower portions of the cooking vessel, the cracklings are less likely to cause degradation of the cooking substance in contact with the food products. Because moisture may be found within the cracklings, such moisture may cause the cooking substance to boil over if the cracklings become mixed with the hot oil in the upper zones of the vessel. Further, if the temperature in the bottom of the cooking vessel is too high, the cracklings may burn causing the oxidation of the cooking substance. Such oxidation reduces the useful life of the cooking substance.

Some fryers include a cooking substance filtration system to remove cracklings and other undesirable solids from the cooking substance. The fryer may include a drain and a drain valve located in the lower portion of the cooking vessel. The drain may be located above a filter tank or may be connected by appropriate conduits to the filter tank. The cooking substance may be drained from the cooking vessel into the filter tank. A pump may be used to draw the cooking substance through a filter in the filter tank and to return the filtered cooking substance to the cooking vessel.

The cold zone temperature is usually maintained by proper thermal design. However, in some fryers this thermal design is so effective that the cold zone temperature is too low. This results in difficulties in temperature regulation and in stratification of the oil in the cooking region of the cooking vessel. The cooking substance in the vessel may form three zones: a cooking zone, a transition zone, and a cold zone. U.S. Pat. No. 5,232,151 to Mercer et al. which is commonly assigned with the present application, describes a method of regulating the temperature of the cold zone of a deep fat fryer to avoid boiling over. A problem still exists with regard to regulation of temperatures in the transition zone.

If the temperature in the transition zone is not raised to a sufficient temperature (e.g., about 250° F.) prior to an initial cooking, moisture from cooking product may settle in this zone during a cooking cycle. At the end of the cooking cycle when pressure is released, moisture is then cooked or boiled off causing eruption or boiling in the vat. This boiling action stirs up crumb sediment or cracklings and can allow sediment to deposit on the next food product. The following food products may then assume an undesirable taste due to the cracklings and sediment.

The transition zone problem occurs primarily on the first cooking cycle after initial activation of the cooking vessel or after a delay during which time the transition zone may cool. After the first cooking cycle of the day or after a first cooking cycles after a long delay, the normal turbulence of the cook zone and the boiling of the cook zone penetrates the transition zone to the extent that the oil has been mixed and reached a sufficient temperature (e.g., about 250° F.).

SUMMARY OF THE INVENTION

Accordingly, the present invention is directed to solving these and other problems in the prior art. Specifically, it is an object of the present invention to provide a deep fat fryer which overcomes these disadvantages by conditioning the cooking substance in the transition zone to ensure that the temperature is sufficient prior to the start of the first cooking cycle.

It is another object of the present invention to provide a deep fat fryer which provides for stability of temperature within the transition zone over extended durations.

It is a further object of the present invention to prevent the boiling over of a cooking substance within a vessel of a deep fat fryer.

It is yet another object of the present invention to provide a computer control system for controlling the temperature within a transition zone of a deep fat fryer.

Accordingly, the present invention provides a deep fat fryer with computer controls for regulating the temperature within a transition zone of the flyer. The present invention permits the swift preheating and reheating of the transition zone of a deep fat fryer by pumping oil or air into the transition zone. The pump used to filter the oil is also used to reintroduce oil into the transition zone. Alternatively, the pump may introduce air into the transition zone causing a mixing of oil from the transition zone with oil from the cook zone. In either case, the cold zone is left substantially undisturbed. The pump cycle preferably lasts a fixed amount of time to heat the oil above the boiling point of water. Specifically, the pump cycle may be about 3 minutes and heats the oil to a minimum temperature of about 250° F.

The invention, further includes a computer controller for controlling pump activity. The controller initiates pump activity in at least two situations. First, upon the initial heat up of the day, the controller initiates a pump cycle that lasts until the fryer reaches a predetermined cook temperature. Second, when the fryer has been idle long enough to cause the temperature of the oil to drop below 250° F., the controller initiates another pump cycle to heat the oil to a minimum temperature of about 250° F.

In addition, the present invention may include a cooking system comprising a vessel for heating a cooking substance. The cooking substance may be divided between a heating zone, a transition zone, and a cold zone. The cooking system also may include at least one first heating element for heating the cooking substance in the heating zone; means for heating the cooking substance in the transition zone; a first temperature sensor for measuring a first temperature of the cooking substance in the heating zone; and a control system including at least one clock and a processor for receiving and storing instructions for heating said cooking substance in the transition zone. The means for heating may be activated when the first temperature equals a predetermined heating zone temperature.

The invention also includes a method for operating a cooking device including a vessel for heating a cooking substance. As noted above, the cooking substance may be divided between a heating zone, a transition zone, and a cold zone. The method may comprise the steps of: measuring a temperature of the cooking substance in the vessel; heating the cooking substance in the heating zone to a first predetermined temperature; and mixing the cooking substance in the transition zone with the cooking substance in the heating zone.

Advantages of this invention include: maximizing efficiency of the fryer; avoiding the addition of a second pump by using the existing filter pump; avoiding unnecessary heating of the cold zone, preventing boiling of settled moisture from the cook zone; preventing stiring of food remains by boiling; and preventing burning of food remains during heating. However, other objects, features, and advantages will be understood from the following detailed description of preferred embodiments of the invention, in connection with accompanying drawings.

DETAILED DESCRIPTION OF PREFERRED EMBODIMENTS

Figure 1:
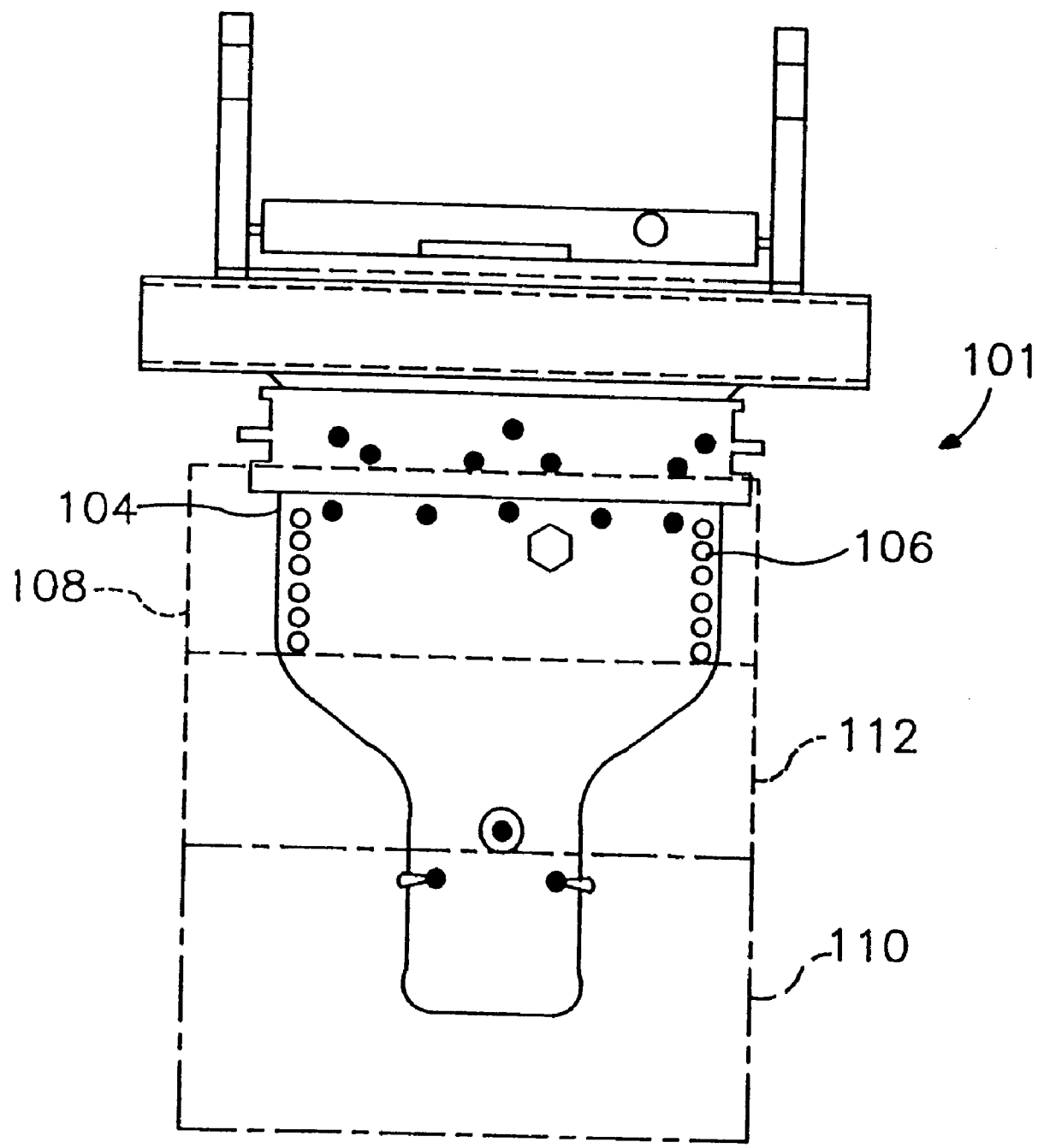
FIG. 1 depicts a fryer according to a first embodiment of the present invention.

FIG. 1 depicts a generalized configuration for one type of flyer which may be used according to a preferred embodiment of the present invention. It will be understood by one of ordinary skill in the art that the present invention, which will be described below, may be readily implemented with various other fryer types and configurations and that the specific flyers in these figures are shown merely as a preferred embodiment and for illustration purposes.

Reference numeral 101 of FIG. 1 depicts a front view of a fryer 104 according to a preferred embodiment of the present invention. Fryer 104 is designed such that a cooking substance (e.g., shortening, oil, fat, etc.) may be inserted into the vessel, and after the substance is heated, food products may be inserted into the cooking substance and deep fried. Fryer 104 may comprise a plurality of heating elements 106 for heating the cooking substance. Heating elements 106 may comprise gas fired heat exchanger tubes, for example. Such a flyer is commonly known by those of ordinary skill in the art. Heating elements 106 may be controlled by operation of a computer control device connected to the heating elements and temperature sensors (not specifically shown) according to known methods in the art.

Due to the placement of the heating devices in such fryers, three zones develop: a heating zone 108 around the heating elements, a cold zone 110, and a transition zone 112. As described above, a problem arises if the transition zone is not at a specified temperature before the initial cooking cycle after each powering of the fryer or after a delay in use of the fryer. At about 12 p.s.i., water boils at about 248° F. Therefore, if the temperature of the transition zone 112 is not at least 250° F. prior to the cooking cycle, then moisture from the cooking product may settle into the transition zone during the cooking cycle. Upon completion of the cooking cycle, when pressure is released, the moisture may boil off causing eruption of boiling in the vessel. This boiling action stirs up cracklings or other food residue from the cooking cycle, causing those particles to settle in the transition zone and cooking zone. When the next food product is placed in the vessel, that food product may then be intermixed with the cracklings which is an undesirable result.

According to the present invention, the temperature in the fryer transition zone is raised to above 250° F. prior to the initial cooking cycle. Additionally, a control system monitors the temperature of the heating zone and the duration since the last cooking cycle. A control circuit such as that shown in FIG. 3 of U.S. Pat. No. 5,232,151 may be used, for example. It will be appreciated by one of ordinary skill in the art that any control system capable of regulating a heating device based upon a detected temperature may be used without departing from the scope of the present invention. A temperature probe/sensor 105 may be provided for monitoring the temperature in the heating zone. Temperature probe/sensor 105 may be connected to a control system for monitoring the temperature and effecting activation of heating and mixing mechanisms as described in detail below.

Figure 2:
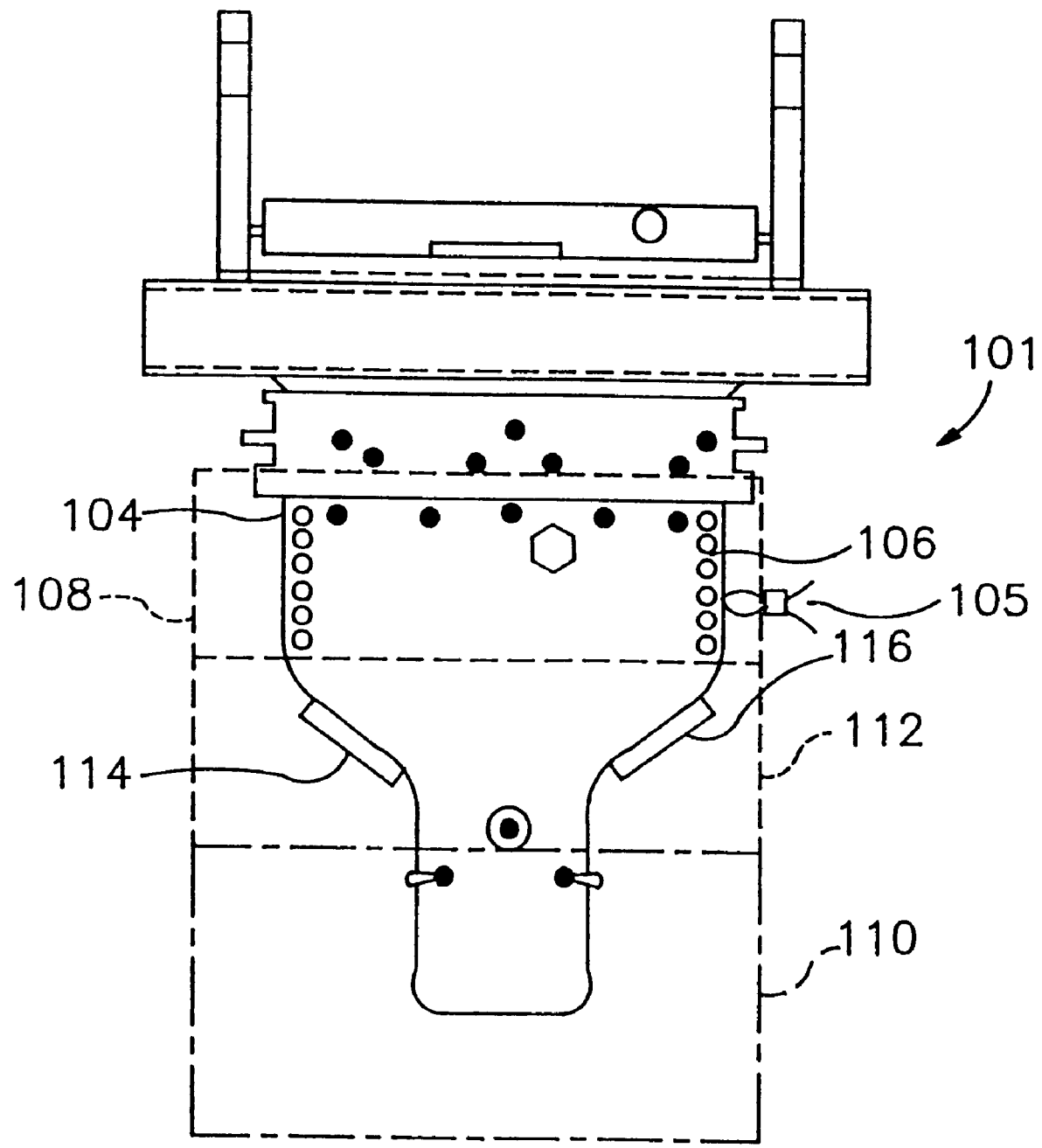
FIG. 2 depicts a fryer according to a second embodiment of the present invention.

According to one embodiment of the present invention, a fryer may be provided with auxiliary heating elements located proximate to the transition zone. FIG. 2 depicts one embodiment of a fryer having auxiliary heating elements according to the present invention. Common element numbers represent like elements with other figures.

According to this embodiment, fryer 104 comprises a plurality of heating elements 114 and 116. Such heating elements may comprise 120 volt, 500 W electric heaters, for example. Other types of heaters may also be used as would be recognized by one of ordinary skill in the art. To condition the oil in the transition zone prior to the initial cooking cycle, when the fryer 104 is initially turned on, both the heating elements 106 and auxiliary heating elements 114 and 116 may be powered so that both the heating zone and the transition zone may be heated simultaneously. Therefore, when the heating zone reaches the desired cooking temperature, the transition zone will also be at the desired cooking temperature.

Heating using auxiliary heaters may take time and may require monitoring during use to ensure that the temperature within the transition zone is maintained at the required level. As such, the heating elements may be required to be on for lengthy periods of time which may cause burning of crumbs which may fall onto the slopes of the transition zone.

According to another embodiment of the present invention, fryer 104 may comprise a mixing mechanism for mixing the cooking substance in the heating zone with the cooking substance in the transition zone. Mixing mechanism 120 preferably comprises a device for mixing the transition zone substance and the heating zone substance without substantially disturbing the cooking substance in the cold zone.

Figure 3:
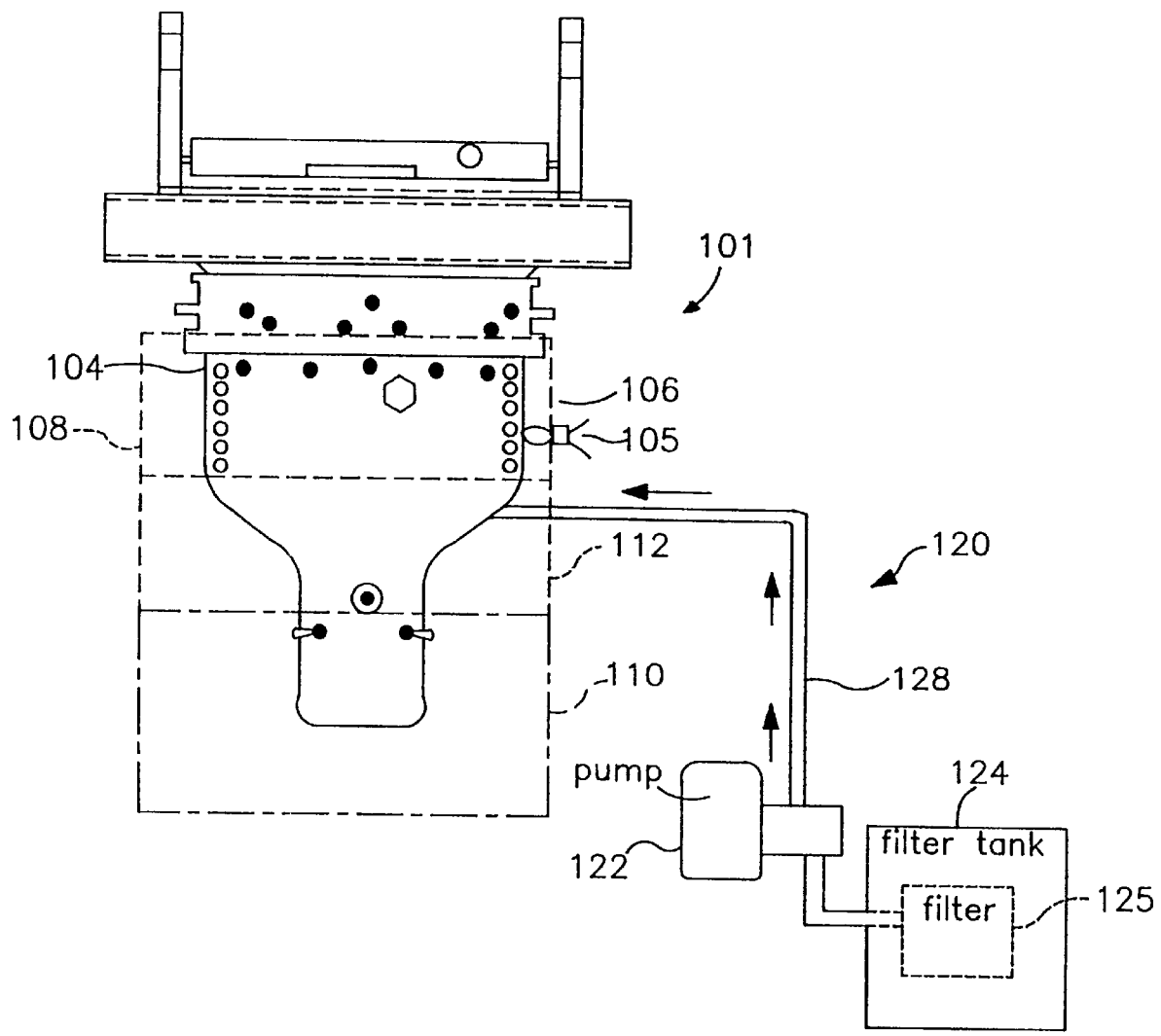
FIG. 3 depicts a fryer according to yet a third embodiment of the present invention.

FIG. 3 depicts one embodiment of a mixing mechanism 120 according to the present invention. Mixing mechanism 120 comprises a pump 122, a filter tank 124, a filter 126, and a return line 128. Pump 122 operates to draw air from filter tank 124 through return line 128 into transition zone 112 of fryer 104. The introduction of air into the transition zone creates a mixing action which causes the cooking substances in the transition zone and the heating zone to internix. Thereby, the temperature of the cooking substance in the transition zone rises to nearly that of the substance in the heating zone. Because most fryers 104 have a pump, filter and filter tank available for filtering oil in the fryer, the structural design of a fryer 104 requires little modification and thereby, re-engineering of the outer structure of the fryer is minimized.

Figure 4:
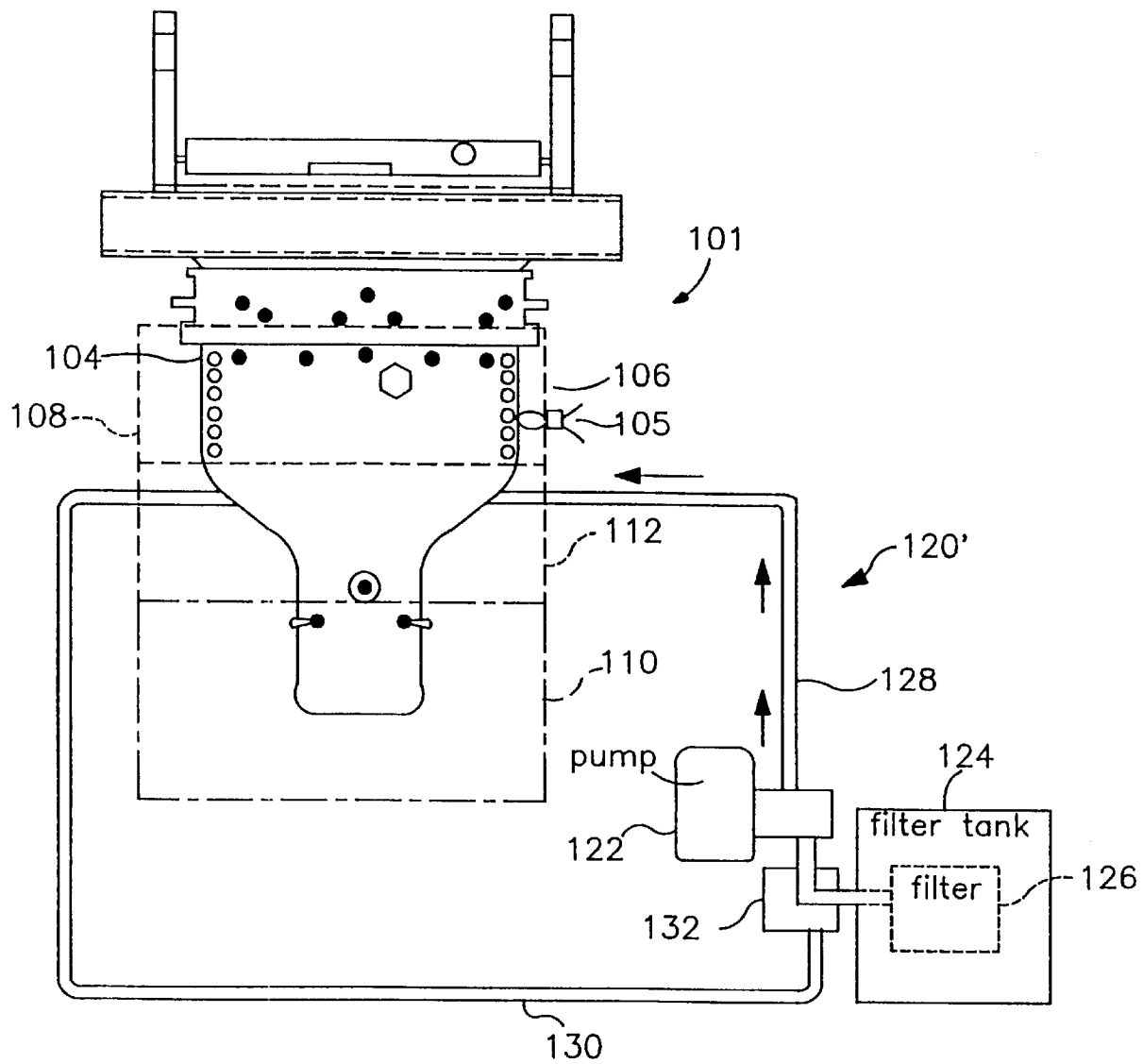
FIG. 4 depicts a fryer according to a fourth embodiment of the present invention.

FIG. 4 depicts another embodiment of a mixing mechanism 120 according to the present invention. Mixing mechanism 120' comprises a pump 122, a filter tank 124, a filter 126, a return line 128, a withdraw line 130, and a valve 132. Pump 122 operates to withdraw oil from the fryer and return the oil into the vessel via return line 128. Valve 132 may comprise a three way directional flow valve to regulate flow of oil into and out of filter 126. By withdrawing oil from one side of the vessel and retuning that oil to the other side of the vessel, a mixing action is generated in the vessel which causes the heating zone and transition zone cooking substances to mix.

In both embodiment of FIGS. 3 and 4, strategic placement of the return line and the withdraw line of FIG. 4 ensures that the cooking substance in the cold zone is relatively undisturbed. Due to the sloping walls of the vessel around the transition zone, placement of the return line at the top or slightly above the sloped walls may ensure that the movement of oil within the vessel is relatively limited to the heating zone and the transition zone. Other placements of the return and withdrawal lines may also be used which avoid significant movement of oil from the cold zone.

Under certain conditions the cooking substance in the pump inlet may solidify. In addition, the filter tank may contain excess amounts of cooking substance. In either situation, the pump is unable to force air into the cooking vessel. This problem may be eliminated by providing an air inlet valve on the pump inlet pipe. The valve may be in the open position when power is supplied to the pump, and closed when power is shut off. This prevents unintentional draining of cooking substance in the event of a power loss. The outlet of the air inlet valve is positioned, so that any cooking substance that may enter the air inlet valve may be drained into the filter tank. Further, the operation of the air inlet valve is coordinated with the draining and filtering processes to permit the heat regulation device of the fryer to function properly. Thus, the air inlet valve is opened to allow air into the cooking vessel during air mixing and after the cooking substance is filtered, to allow liquid cooking substance to drain back into the filter tank.

Figure 5:
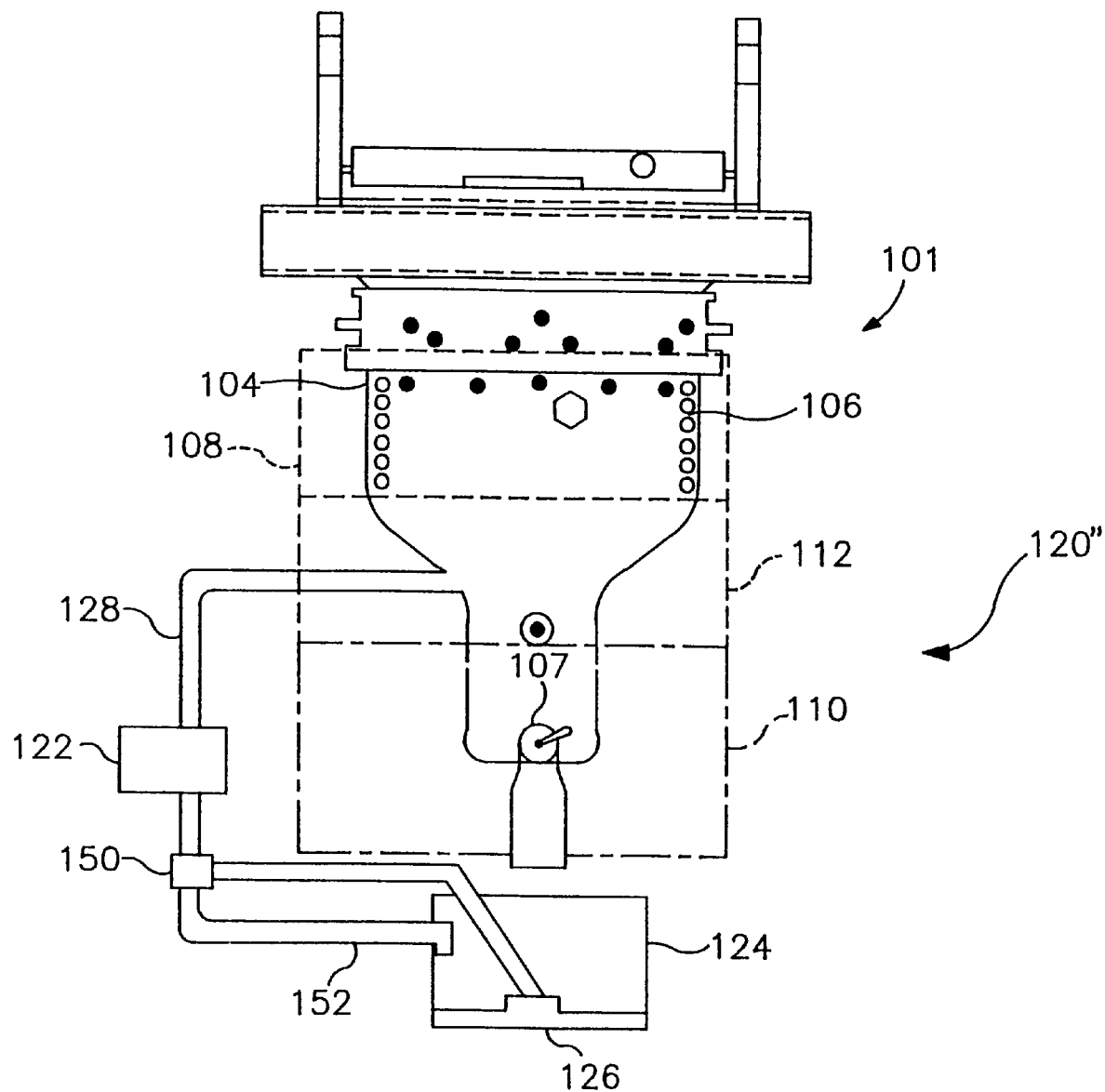
FIG. 5 depicts a fryer including an air valve on the suction side of a cooking substance pump according to a fifth embodiment of the present invention.

FIG. 5 depicts still another embodiment of a mixing mechanism 120" according to the present invention. Mixing mechanism 120" comprises a pump 122, a filter tank 124, a filter 126, and a return line 128. Further, mixing mechanism 120" includes an air inlet valve 150 positioned on the inlet side of pump 122. Air inlet valve 150 may be a solenoid operated, gate valve. Suitable valves include the ASCO® Red-Hat® Valve (Catalog No. 8262G36), which is commercially available from American Switch Company (ASCO) of Florham Park, N.J., U.S.A. The cooking substance in fryer 104 may be drained through a drain valve 107 into filter tank 124. When air inlet valve 150 is closed, the cooking substance may be returned to fryer 104 by using pump 122 to draw the cooking substance through a filter 126. In addition, air inlet valve 150 includes a valve drain 152, whereby any cooking substance that may enter air inlet valve 150 may be drained into filter tank 124. Thus, for example, after the cooking substance is filtered, any cooking substance remaining in return line 128 may be drained to filter tank 124. This would prevent cooking substance from solidifying in return line 128.

According to an embodiment of the present invention, mixing mechanism 120 may be operated according to the following method through the operation of a suitable control system as described above—for example, such as one described in FIG. 3 of U.S. Pat. No. 5,232,151. The control system may include a series of operating instructions to direct the cooking process and, in particular, the heat regulation device of the present invention. For example, there may be at least about six modes of operation in the cooking process. A first mode is the cold start mode. The cold start mode is entered when the fryer heat source has been turned off for an extended period of time, such that the cooking substance temperature has dropped below a predetermined minimum temperature, e.g., about 100° F. A second mode is the cooking mode. In the cooking mode, the fryer is operated to cook food product. A third mode is the cook idle mode. The cook idle mode is entered when the cooking substance is maintained at its cooking temperature, but the fryer is not being used to cook food product. A fourth mode is the cool mode. In the cool mode, the cooking substance is maintained at a temperature well below cooking temperatures. The cool mode may be entered when the fryer is not immediately needed for cooking, but may be used for cooking in the near future. A fifth mode is the forced filter mode. The forced filter mode causes the cooking substance in the fryer to be periodically filtered. As noted above, periodic filtering of the cooking substance lengthens the useful life of the cooking substance and improves its quality. For example, the forced filter mode may determine the filtering period based on the type of food product cooked and the number of cooking cycles completed for the food product. A sixth mode is the non-forced filter mode. The non-forced mode also causes the cooking substance in the fryer to be filtered. However, this mode may be initiated at the discretion of the system operator.

According to the present invention, the mixing mechanism may be activated for a predetermined period or until prescribed temperature set points are reached when certain operational conditions are realized. For example, the mixing mechanism may be activated following a transition from a cold start mode to a cool mode or a cook idle mode or a transition from a cool mode to a cook idle mode, when the cool mode has lasted for a predetermined period, e.g., for more than about 30 minutes. In addition, the mixing mechanism may be activated when the control system has operated in a cook idle mode, without interruption, for a predetermined period, e.g., for more than about 30 minutes. Further, the mixing mechanism may be activated following operation in a forced or non-forced filter mode.

At the first powering up of fryer 104, fryer 104 may be programmed to heat to a "cool" mode which may be about 250° F., for example. Fryer 104 may maintain this temperature until the computer control circuitry indicates that a cooking cycle is to be entered. Computer control circuitry may indicate this upon manual entry by a user of the fryer, for example. Upon instruction by a user to enter a cooking cycle, computer control turns on heating elements 106 to instruct them to rise to the desired cooking temperature.

At the same time, mixing mechanism 120 may be activated. According to a preferred embodiment of the present invention, when the temperature is about equal to 250° F. in the heating zone, mixing mechanism 120 may operate for less than about 3 minutes to raise the temperature in the transition zone to about 250° F. This time is less than required for the fryer to raise the temperature of the heating zone from 250° F. to the cooking temperature.

According to another preferred embodiment of the present invention, mixing mechanism 120 may be activated for a shorter duration by allowing the temperature in the heating zone to rise before activation. According to this embodiment, mixing mechanism 120 may be activated when the temperature in the heating zone reaches the desired cooking temperature minus a predetermined differential, such as 5° F., for example. In one embodiment, the cooking temperature may be about 345° F. and the predetermined differential may be about 5° F. In this embodiment, mixing mechanism 120 may be activated by the computer control circuitry when the temperature in the heating zone reaches 340° F. and may be active for a predetermined time such as about 35 seconds, for example. Operation of computer control circuitry based on temperature and duration is well known in the fryer art, for example, as described in U.S. Pat. Nos. 5,232,141 and 4,913,038.

After the initial cooking cycle, fryer 104 may be idled for various periods of time. During these idle periods, the temperature in transition zone 112 may recede to a temperature less than the specified temperature (e.g., less than 250° F.). Consequently, according to the present invention, mixing mechanism 120 may be activated during idle times to ensure that the temperature in transition zone 112 is maintained above the specified temperature. Alternatively, mixing mechanism 120 may be reactivated before cooking cycles are entered.

When fryer 104 has been in an idle cycle (i.e., when the oil temperature in the heating zone is considerably lower than the cooking temperature) and then a command is received to proceed to a cooking temperature by a user, mixing mechanism 120 may be engaged when the temperature in the heating zone reaches the desired cooking temperature minus a predetermined differential. The length of time mixing mechanism 120 may be operated may be varied depending on the length of time fryer 104 has been in an idle cycle so as to minimize the use of mixing mechanism 120 while still raising the temperature in the transition zone above the specified temperature. Essentially, operation times for mixing mechanism 120 may be determined such that the specified temperature is reached before the cooking operation proceeds.

Figure 6:
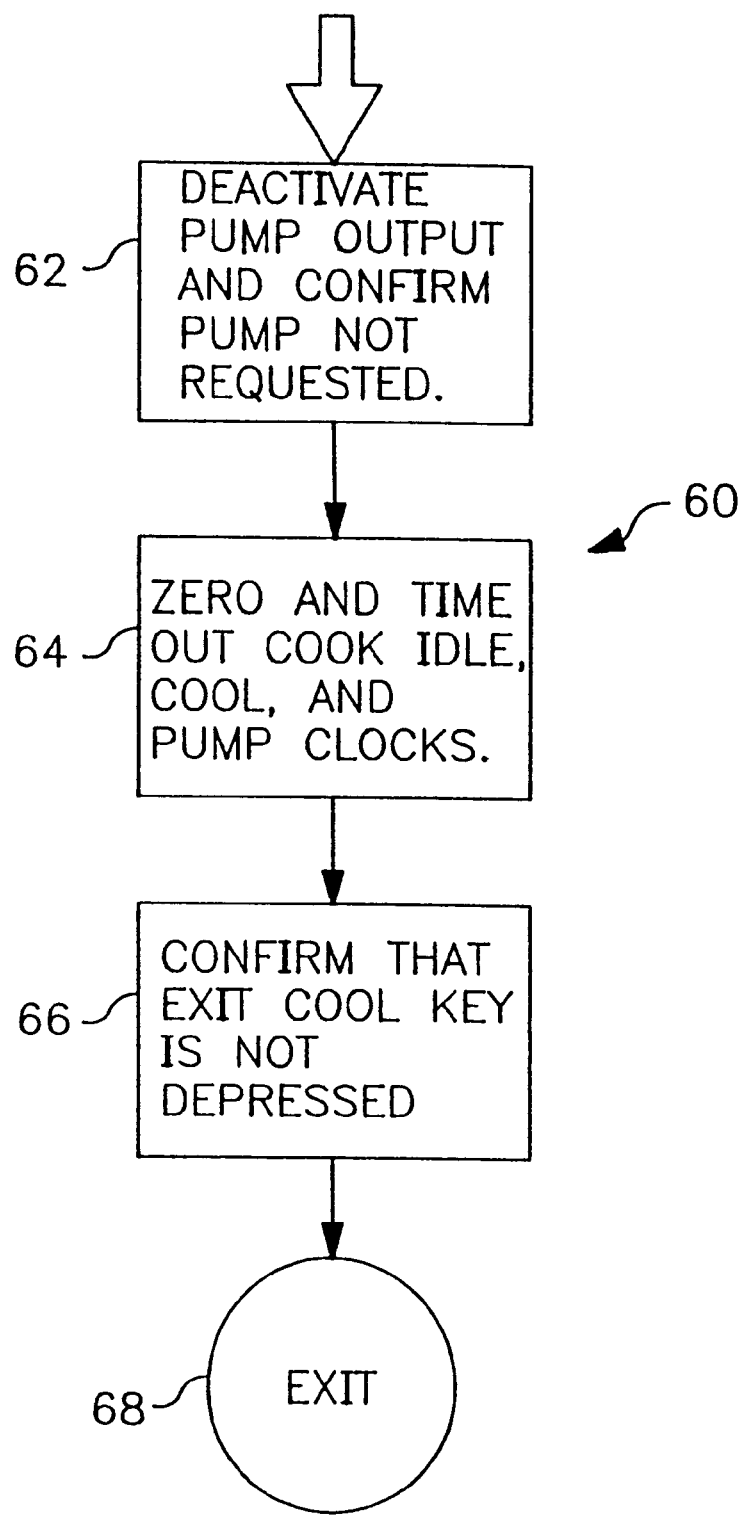
FIG. 6 is a flow chart depicting a pump control initialization routine.
Figure 7:
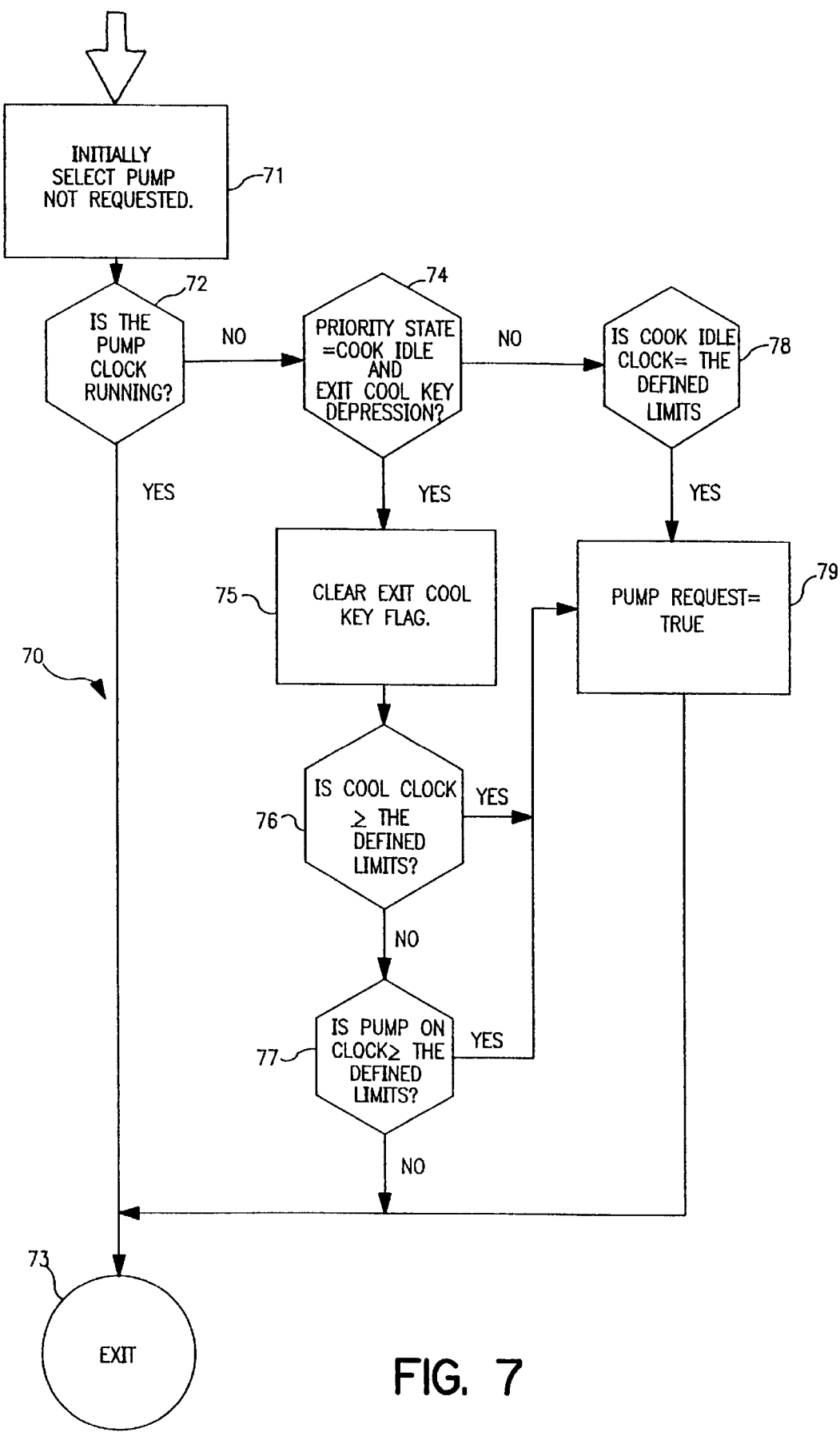
FIG. 7 is a flow chart depicting a pump request confirmation routine.
Figure 8:
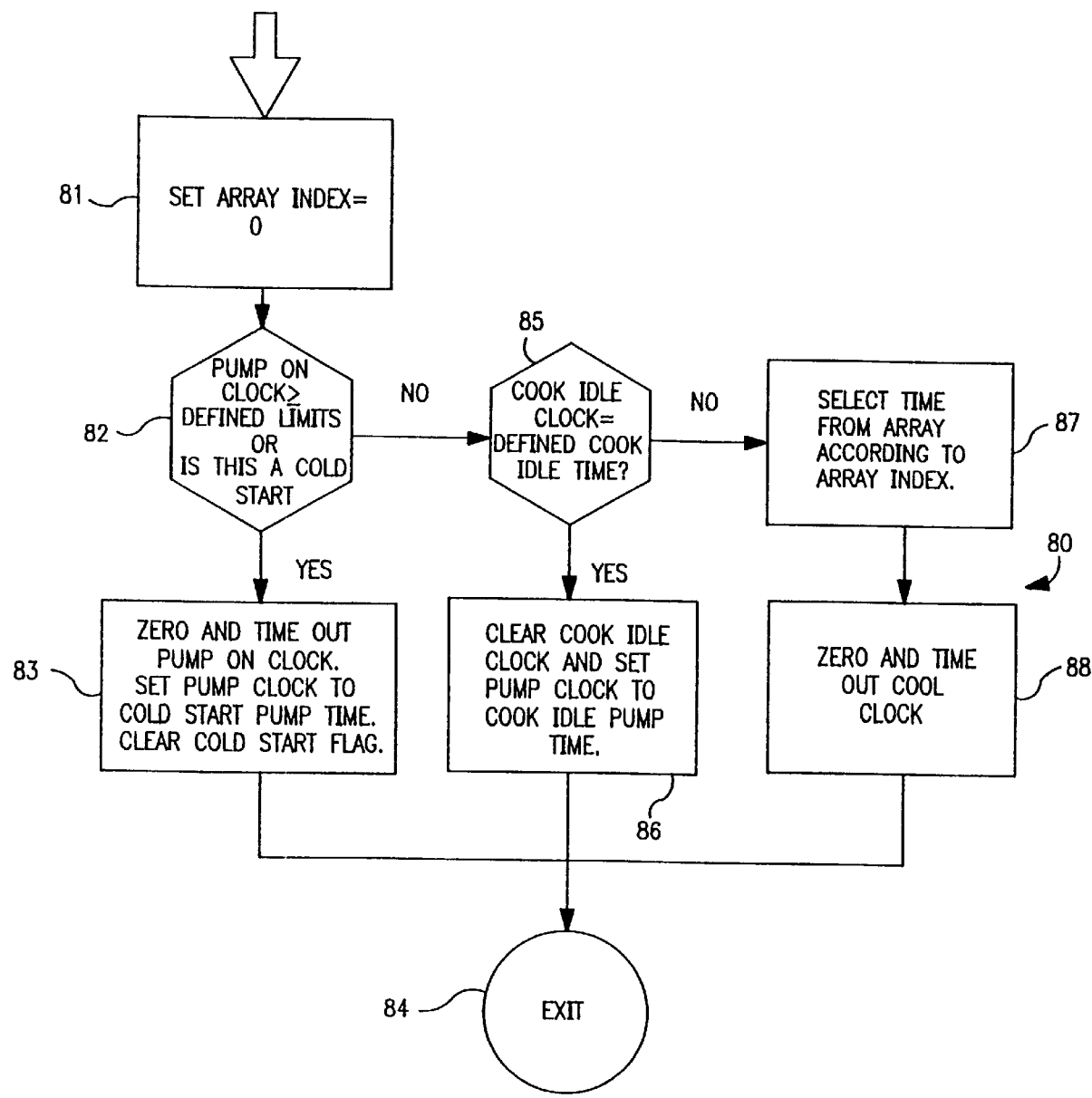
FIG. 8 is a flow chart depicting a pump run time selection routine.

The flow charts FIGS. 6–9 depict various routines which may comprise the mixing mechanism control process. These routines include FIG. 6, which is a flow chart depicting a pump control initialization routine 60; FIG. 7, which is a flow chart depicting a pump request confirmation routine 70; FIG. 8, which is a flow chart depicting a pump run time selection routine 80; and FIG. 9, which is a flow chart depicting a pump control routine 90.

Referring to FIG. 6, the control process may begin by initializing the pump control. In an initial step, step 62, a pump output switch is placed in the off position and the system confirms that pump operation has not been requested. The control system may include a plurality of internal clocks, timers, or timing devices for measuring and monitoring the duration of selected control system events. For example, the control system may include clocks for measuring the duration of the Cook Idle and Cool modes and for measuring the duration of pump operation periods and total pump operations. In the following step, step 64, the Cook Idle, Cool, and Pump clocks are stopped, i.e., timed out, and are zeroed, the time value is reset to zero. Finally, in step 66, the control system confirms that an Exit Cool key has not been depressed. As noted above, in the Cool mode, the cooking substance is maintained at a temperature well below cooking temperatures. The cool mode may be entered when the fryer is not immediately needed for cooking, but may be used for cooking in the near future. When the Exit Cool key is depressed, the control system begins readying the fryer for cooking. The mixing mechanism may be activated following a transition from a Cool mode to a Cook Idle mode, when the Cool mode has lasted for a predetermined period, e.g., for more than about 30 minutes. Initialization is then complete, and, as indicated by step 68, the control system exits routine 60.

Referring to FIG. 7, the control process may continue by confirming a pump operation request. With respect to step 71, routine 70 is run when pump operation has not yet been requested, e.g., initialization routine 60 including step 62 has been successfully run. In step 72, the control system determines whether the Pump clock is running. If the Pump clock is running, pump operation has already been requested. Consequently, as indicated by step 73, the control system exits routine 70. However, if the Pump clock is not running, routine 70 proceeds to step 74, in which the control system determines whether the Cook Idle mode has been selected and whether the Exit Cool key has been depressed. If both these conditions are met, an Exit Cool key flag or stop condition is cleared in step 75, and the system proceeds to step 76, in which the system determines whether the Cool clock has been running for a period of time greater than or equal to a defined limit, e.g., for more than about 30 minutes. If the Cool clock has not been running for a period of time greater than or equal to the defined limit, the control system next considers in step 77, whether a Pump On clock has measured a period of time greater than or equal to a defined limit. The Pump On clock measures and monitors the total time that the pump has been operating, for example, since Cold Start mode was initiated. If the Pump On clock also has not been running for a period of time greater than or equal to the defined limit, pump operation has not been requested, and as indicated by step 73, the control system exits routine 70. However, if the answer to either of the questions asked in steps 76 and 77 is yes, a pump request is confirmed in step 79. s confirmed in step 79. Alternatively, if the Cook Idle clock equals a defined limit, the pump request is confirmed in step 79, and the control system exits routine 70.

Referring to FIG. 8, the control process may continue by selecting a pump run time. Pump run times may be included in an array or set of time values, such as those set forth hereinafter in Table 1. An array index is a counter or marker for identifying the position or location of the control process in the array. For example, when pump operation is initiated according to an array including n pump controlling time values, the array index equals zero. The array index equals n when pump operation according to the array is complete. In step 81, the array index is initially assigned a value of zero. In step 82, the control system determines whether the Pump On clock has measured a total time that is greater than or equal to a defined limit or whether a Cold Start is being initiated. If the answer to either question asked in step 82 is yes, the Pump On clock is cleared and the display indicates that the clock is timed out. Further, as indicated in step 83, the Pump clock is set to operate according to the Cold Start Pump Time instructions and the Cold Start flag is cleared. As indicated by step 84, the control system exits routine 80. However, if the answer to either of the questions posed in step 82 is no, the control system determines in step 85 whether the time measured by the Cook Idle clock equals a defined Cook Idle time. If so, the Cook Idle clock is cleared in step 86, and the Pump clock is set to the Cook Idle Pump time. As indicated by step 84, the control system again exits routine 80. Finally, if neither the questions asked in step 82 or 85 are answered yes, a Cool time for step 87 is selected from a table of time values, such as are described in Table 1 herein. The time measured on the Cool clock is zeroed and the clock is timed out, as indicated in step 88. Once the pump run time has been selected, the control system exits routine 80.

Figure 9:
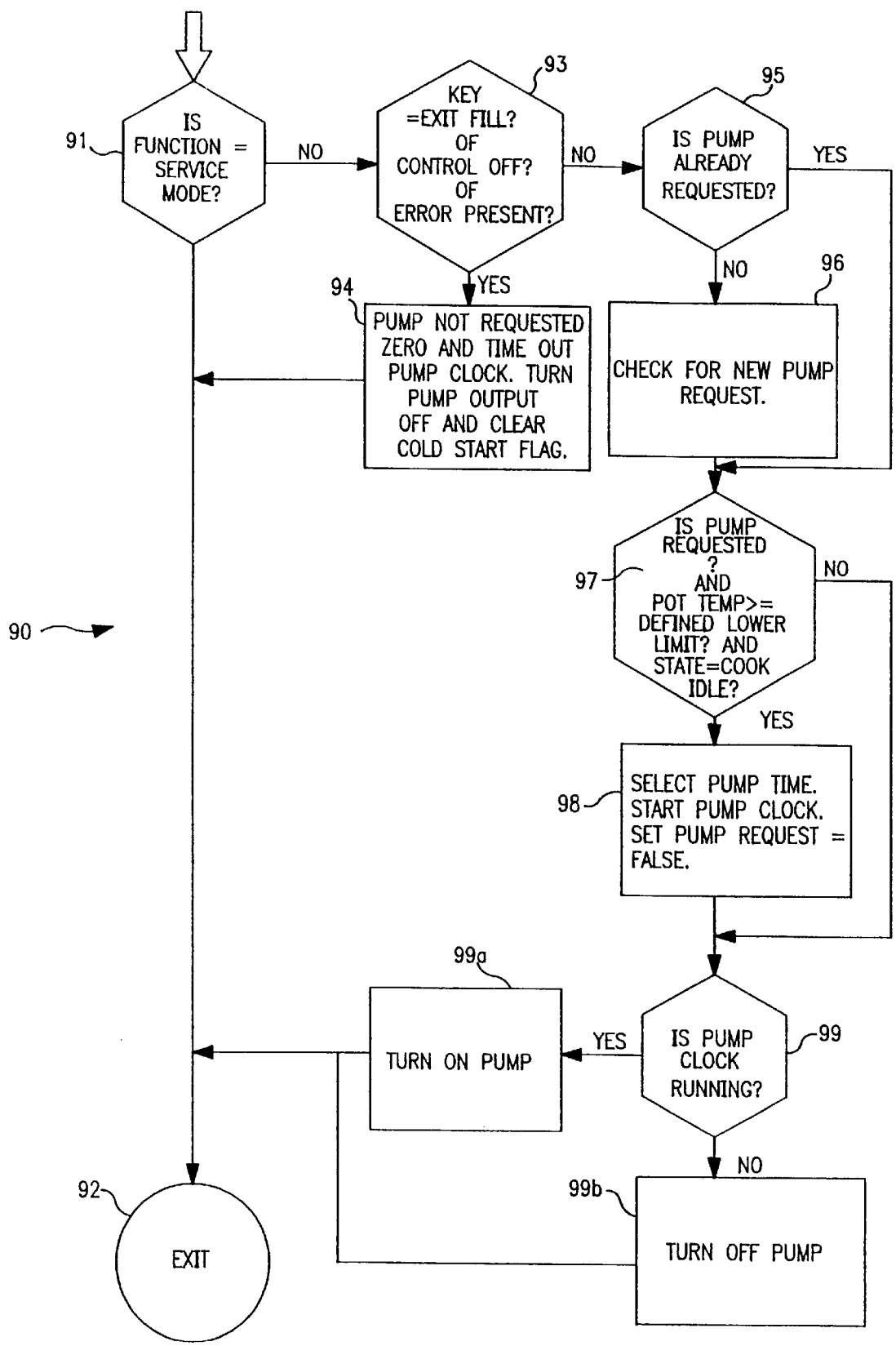
FIG. 9 is a flow chart depicting a pump control routine.

Referring to FIG. 9, the control process may continue by controlling the operation of the pump. In step 91, the system initially inquires whether the fryer is functioning in a Service mode. The Service mode permits operation of fryer elements, including the pump, manually. In this manner, these elements may be tested and maintenance may be performed on the fryer. If the Service mode is selected, automatic or computer controlled pump operation is not desired, and the control system exits routine 90. However, if the fryer is not in the Service mode, the control system determines the position of a three position control switch (not shown) in step 93. When the control switch is in a first position, a power-on position, the pump may operate automatically or under computer control. When the control switch is in a second position, a manual pump operation position, the pump may be activated at an operator's discretion to override programmed operation. Finally, when the control switch is in a third position, a power-off position, no power is supplied to the pump and the pump may not operate. An Exit Fill key provides a direct override of pump operation. If the pump is running, it may be deactivated by depressing the Exit Fill key. Therefore, if the control switch is in the third position or if the Exit Fill key has been depressed or if an error has been detected in the system; then the pump has not been requested, and the Pump clock is timed out and zeroed. Further, as indicated in step 93, a pump output switch is deactivated, and the Cold Start flag is cleared.

If the answer to each of the inquiries posed in step 93 is no, the control system inquires whether a pump request has already been initiated in step 95. If no request has been made, the control system confirms whether a new pump request is initiated in step 96. If a pump request has already been initiated or if a new pump request is initiated, i.e., if either of the inquiries posed in steps 95 or 96 is answered yes; the system inquires in step 97 confirms that the pump has been requested, that the temperature of the cooking substance (the "Pot Temp") is greater than or equal to a defined lower limit, e.g., a heating temperature minus a predetermined differential, and that the system is in the Cook Idle mode. If all of the conditions of step 97 are satisfied; in step 98, a pump time is selected, the Pump clock is started, and the system indicated that no pump request was made. If not, the control process proceeds to step 99.

In step 99, the control system confirms whether the Pump clock is running. If so, the pump is turned on, as indicated in step 99a. If not, the pump is turned off, as indicated in step 99b. Once a determination has been made to turn the pump on (step 99a) or to turn the pump off (step 99b), the control system exits routine 90.

EXAMPLE

The present invention may be further understood by considering the following example, which is intended to be purely exemplary of the invention. According to the invention, the control system may include computer controlled circuitry, and the controlling computer may be programmed with software, such as that included in the microfiche appendices.

The following table illustrates an example of the duration of operation of the mixing mechanism based on different idle cycle times.

TABLE 1

| Length of time in idle cycle | Mixing mechanism operation duration |
| --- | --- |
| 0–29 minutes | 0 |
| 30 minutes | 10 seconds |
| 50 minutes | 17 seconds |
| 90 minutes | 25 seconds |
| 120 minutes and up | 35 seconds |

During cook cycle, there may be idle times of non-use, i.e., an idle time during the cook cycle. During idle times mixing mechanisms, e.g., mixing mechanism 120, may be activated to ensure that the transition zone temperature does not fall below the specified temperature. Every predetermined amount of idle time, mixing mechanism 120 may be activated for second predetermined amount of time. For example, every 30 minutes, mixing mechanism 120 may be activated for 15 seconds. These times are designed to ensure that the temperature in the transition zone does not fall below 250° F. Other times and durations may be used for other specified temperatures for the transition zone. All of the process parameters may be programmed and executed using the fryer process controller.

Other embodiments of the invention will be apparent to persons skilled in the relevant art from a consideration of this specification or practice of the invention disclosed herein. It is intended that the specification and examples be considered as exemplary only. Although a detailed description of the present invention is provided above, it is to be understood that the scope of the invention is not limited thereby, but is determined by the claims which follow.

We claim:

1. A cooking device including a vessel for heating a cooking substance, said cooking substance divided between a heating zone, a transition zone, and a cold zone; at least one first heating element for heating said cooking substance in said heating zone; and means for heating said cooking substance in said transition zone, wherein said means for heating comprises a pump for introducing a mixing medium into said cooking substance in said transition zone whereby said cooking substance in said heating zone mixes with said cooking substance in said transition zone.

2. The cooking device of claim 1, wherein said mixing medium is air, whereby said cooking substance in said heating zone is turbulently mixed with said cooking substance in said transition zone.

3. A cooking device including a vessel for heating a cooking substance, said cooking substance divided between a heating zone, a transition zone, and a cold zone; at least one first heating element for heating said cooking substance in said heating zone; and means for heating said cooking substance in said transition zone, wherein said means for heating comprises a pump for introducing a mixing medium into said cooking substance in said transition zone whereby said cooking substance in said heating zone mixes with said cooking substance in said transition zone, and wherein said mixing medium is a portion of said cooking substance withdrawn by said pump from said transition zone and then reintroduced to said transition zone, thereby creating turbulence in said transition zone.

4. The cooking device of claim 1, wherein said means for heating comprises at least one second heating element.

5. The cooking device of claim 1, wherein said cooking substance is selected from the group consisting of shortening and cooking oil.

6. The cooking device of claim 4, wherein said at least one second heating element is an electric heater.

7. The cooking device of claim 3, wherein a first conduit places said transition zone in communication with an inlet port of said pump and a second conduit places an outlet port of said pump in communication with said transition zone.

8. The cooking device of claim 7, wherein said first conduit communicates with said inlet port of said pump via a three-way directional valve, said valve directing said portion of said cooking substance withdrawn from said transition zone into and out of a filter, whereby cracklings are removed from said portion.

9. The cooking device of claim 1, further comprising a filter tank including a filter and a drain valve, whereby at least a portion of said cooking substance is drained from said vessel to said filter tank, and wherein said at least a portion of said cooking substance is reintroduced to said transition zone, thereby creating turbulence in said transition zone.

10. The cooking device of claim 9, further comprising a return line in communication with the transition zone for reintroducing said at least a portion of said cooking substance in said transition zone.

11. A cooking device including a vessel for heating a cooking substance, said cooking substance divided between a heating zone, a transition zone, and a cold zone; at least one first heating element for heating said cooking substance in said heating zone; means for heating said cooking substance in said transition zone; and a filter tank including a filter, a return line, and a drain valve, whereby at least a portion of said cooking substance is drained from said vessel to said filter tank, and wherein said return line further includes an air inlet valve positioned between said filter tank and said pump, so that air may be introduced to said transition zone, thereby creating turbulence in said transition zone.

12. The cooking device of claim 11, said air inlet valve further comprising a valve drain, whereby cooking substance in said air inlet valve is drained to said filter tank.

13. The cooking device of claim 11, wherein said air inlet valve is a solenoid operated, gate valve.

14. A cooking system comprising a vessel for heating a cooking substance, said cooking substance divided between a heating zone, a transition zone, and a cold zone; at least one first heating element for heating said cooking substance in said heating zone; means for heating said cooking substance in said transition zone, wherein said means for heating comprises a pump and a return line in communication with said transition zone for reintroducing said at least a portion of said cooking substance in said transition zone; a first temperature sensor for measuring a first temperature of said cooking substance in said heating zone; and a control system including at least one clock and a processor for receiving and storing instructions for heating said cooking substance in said transition zone, such that said means for heating is activated when said first temperature equals a predetermined heating zone temperature.

15. The cooking system of claim 14, further comprising a second temperature sensor for measuring a second temperature of said cooking substance in said transition zone and wherein said means for heating is deactivated when said second temperature equals a predetermined transition zone temperature.

16. The cooking system of claim 14, wherein said means for heating is activated for a predetermined time period.

17. The cooking system of claim 14, wherein said predetermined heating zone temperature equals a cooking temperature minus a predetermined temperature differential.

18. The cooking system of claim 14, wherein said control system includes an idle mode during which said means for heating is activated for a predetermined time period during each of a predetermined time interval.

19. A method for operating a cooking device including a vessel for heating a cooking substance, said cooking substance divided between a heating zone, a transition zone, and a cold zone; comprising the steps of: measuring a temperature of said cooking substance in said vessel; heating said cooking substance in said heating zone to a first predetermined temperature; and mixing said cooking substance in said transition zone with said cooking substance in said heating zone by withdrawing a portion of said cooking substance from said transition zone and then reintroducing said withdrawn portion to said transition zone, thereby creating turbulence in said transition zone.

20. A method for operating a cooking device including a vessel for heating a cooking substance, said cooking substance divided between a heating zone, a transition zone, and a cold zone, comprising the steps of: measuring a temperature of said cooking substance in said vessel; heating said cooking substance in said heating zone to a first predetermined temperature: and mixing said cooking substance in said transition zone with said cooking substance in said heating zone, wherein said step of mixing further comprises creating turbulence within said cooking substance in said transition zone and, wherein said turbulence is created by introducing air into said cooking substance in said transition zone.

21. A method for operating a cooking device including a vessel for heating a cooking substance, said cooking substance divided between a heating zone, a transition zone, and a cold zone; comprising the steps of: measuring a temperature of said cooking substance in said vessel; heating said cooking substance in said heating zone to a first predetermined temperature; and mixing said cooking substance in said transition zone with said cooking substance in said heating zone, wherein said step of mixing further comprises creating turbulence within said cooking substance in said transition zone and, wherein said turbulence is created by draining a portion of said cooking substance from said vessel and reintroducing said portion to said transition zone.

22. The method of claim 19, further comprising maintaining said cooking substance in said heating zone at a second predetermined temperature, which is less than said first predetermined temperature, prior to heating a food product in said heating zone.

* * * * *